(12) United States Patent
Nachyla

(10) Patent No.: US 10,764,754 B2
(45) Date of Patent: Sep. 1, 2020

(54) WIRELESS MAGNETIC COMMUNICATION METHOD AND A WIRELESS MAGNETIC COMMUNICATION DEVICE

(71) Applicant: Dariusz Nachyla, Bielawa (PL)

(72) Inventor: Dariusz Nachyla, Bielawa (PL)

( * ) Notice: Subject to any disclaimer, the term of this patent is extended or adjusted under 35 U.S.C. 154(b) by 121 days.

(21) Appl. No.: 15/764,879

(22) PCT Filed: Sep. 29, 2016

(86) PCT No.: PCT/PL2016/000110
§ 371 (c)(1),
(2) Date: Mar. 29, 2018

(87) PCT Pub. No.: WO2017/058036
PCT Pub. Date: Apr. 6, 2017

(65) Prior Publication Data
US 2018/0317091 A1    Nov. 1, 2018

(30) Foreign Application Priority Data

Sep. 30, 2015    (PL) .......................................... 414226

(51) Int. Cl.
*H04W 12/08* (2009.01)
*H04B 5/00* (2006.01)
(52) U.S. Cl.
CPC .......... *H04W 12/08* (2013.01); *H04B 5/0031* (2013.01); *H04B 5/0056* (2013.01); *H04L 2209/80* (2013.01)
(58) Field of Classification Search
CPC ............................. H04W 12/08; H04B 5/0031
(Continued)

(56) References Cited

U.S. PATENT DOCUMENTS

2013/0244700 A1    9/2013  Elias
2014/0248853 A1    9/2014  Shipley
(Continued)

FOREIGN PATENT DOCUMENTS

EP    1414264       4/2014
WO    2010096917    9/2010
WO    2014200485    12/2014

OTHER PUBLICATIONS

WO2017058036 International Search Report, Written Opinion, Search Strategy.

*Primary Examiner* — Anthony D Brown
(74) *Attorney, Agent, or Firm* — STLG; Soody Tronson

(57) ABSTRACT

A method for wireless magnetic communication consisting in the processing of information encrypted by the transmitter using the magnetic field and decrypted by the receiver comprising proximity magnetic sensors is characterized according to the invention in that the transmitter is equipped with a magnetic system with a planarly shaped configuration of magnetic elements, and then the transmitter is placed against the receiver which is coupled to the first microprocessor controller, and then using the magnetic sensors of the receiver the configuration of the magnetic field generated by the magnetic elements of the transmitter by is recreated, and next, using the first microprocessor controller, one compares such configuration with the pattern implemented therein, and then, in accordance with the software implemented in the first microprocessor controller further actions corresponding with that pattern are launched. Permanent magnets or time varying magnetic field generators are used as magnetic elements with a favorable effect. The object of the invention is also the system for implementation of this method.

18 Claims, 2 Drawing Sheets

Figure 1:
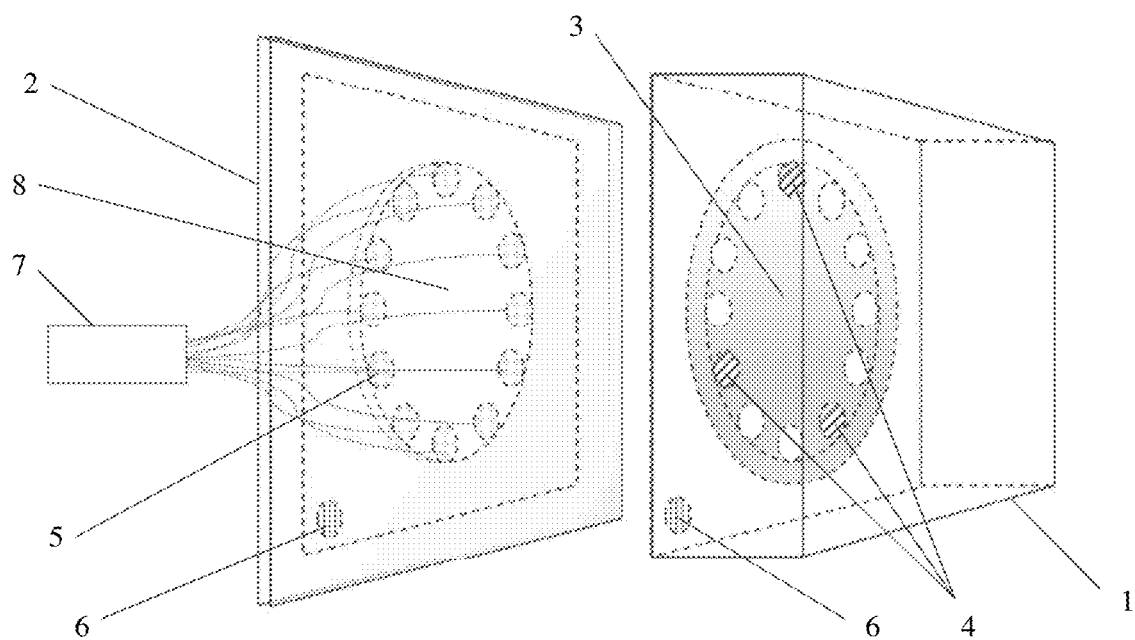

(58) Field of Classification Search
USPC .......................................................... 380/270
See application file for complete search history.

(56) References Cited

U.S. PATENT DOCUMENTS

2014/0273826 A1    9/2014   Want
2015/0318624 A1*   11/2015   Schantz .................. G01S 5/14
                                                                                                 343/867

* cited by examiner

WIRELESS MAGNETIC COMMUNICATION METHOD AND A WIRELESS MAGNETIC COMMUNICATION DEVICE

The object of the invention is a method and a device for wireless magnetic communication applicable to operation of automation and remote control equipment, in particular in industrial facilities and processes, utilities, at commercial premises and in households.

There exist many methods of wireless communication which use the propagation of electromagnetic waves, which waves are then converted into electrical spikes that allow one to control devices using microprocessor controllers.

A system and method for transmitting code using a short-range magnetic field is known from the application documents US2014273826. A secure system wirelessly transmits, via a magnetic field transmitter, an access code to a handheld wireless communication device as a sequence of polarities of a short-range magnetic field. The wireless communication device senses the code from the sequence of polarities. The code provides access to the secure system. The handheld wireless communication device can wirelessly transmit the code received from the short-range magnetic field and identification information to the secure system to receive access to the secure system. The access is personalized based on at least the identification information and is maintained or validated when the handheld wireless communication device is within range of the short-range magnetic field. The method enables obtaining a secure connection with devices such as cellular phone, smartphone or walkie-talkie.

A wireless magnetic communication method consisting in the processing of information encrypted in the transmitter using the magnetic field and decrypted by the receiver with proximity magnetic sensors is characterised in that the transmitter is equipped with a magnetic system with a planarly shaped configuration of magnetic elements. The transmitter is placed against the receiver which one couples to the first microprocessor controller. Then, via the receiver's magnetic sensors, the configuration of the magnetic field generated by the magnetic elements of the transmitter by is recreated, and next, using the first microprocessor controller one compares such configuration with the pattern implemented therein. Subsequently, according to the software implemented in the first microprocessor controller, further actions corresponding with that pattern are launched.

Permanent magnets are used as magnetic elements with a favourable effect.

The magnetic system is embedded astatically in a permanent element of the transmitter with a favourable effect.

Time varying magnetic field generators are used as magnetic elements with a favourable effect.

The transmitter is equipped with a second microprocessor controller with a favourable effect.

Wireless magnetic communication device comprising a receiver equipped with proximity magnetic sensors and a transmitter of information encrypted using a magnetic field is characterised in that the transmitter is equipped with a magnetic system with a planarly shaped configuration of magnetic elements which are permanently embedded therein. The receiver has a system of magnetic sensors which is configured in a form constituting the mapping of the magnetic system. The system of magnetic sensors is coupled to the first microprocessor controller with the implemented configuration pattern of magnetic elements of the magnetic field and the software comparing the configuration of the magnetic field generated by the magnetic elements with that pattern and launching further actions corresponding with that pattern.

Permanent magnets are used as magnetic elements with a favourable effect.

The magnetic system is embedded astatically in a permanent element of the transmitter with a favourable effect.

Time varying magnetic field generators are used as magnetic elements with a favourable effect.

The transmitter is equipped with a second microprocessor controller with a favourable effect.

The transmitter and the receiver have been equipped with location markers with a favourable effect.

On or below the transmitter's surface, there is mounted a permanent magnets system of a particular configuration or a system generating varying magnetic fields in accordance with a specified scheme, built with the use of elements that generate small magnetic fields. The transmitter is placed against the surface of the receiver in which a matrix of magnetic field sensors coupled to the first microprocessor controller is located.

With the use of the magnetic field sensors contained in the receiver, a permanent or varying magnetic field configuration generated in the transmitter is recreated, and next, using the microprocessor controller, such configuration is compared with the pattern implemented therein. Compliance with the pattern initiates further actions corresponding with that pattern, in accordance with the software implemented in the controller. In compliance with the pattern does not result in taking actions, or triggers actions appropriate to such situation, i.e. to an unauthorized communication attempt.

Wireless magnetic communication method, according to the invention, offers security, reliability, energy efficiency and low cost of communication. Furthermore, all active elements taking part in the communication can be hidden inside the casing of both the transmitter and receiver. This makes the communication system, according to the invention, aesthetic and discrete.

Figure 2:
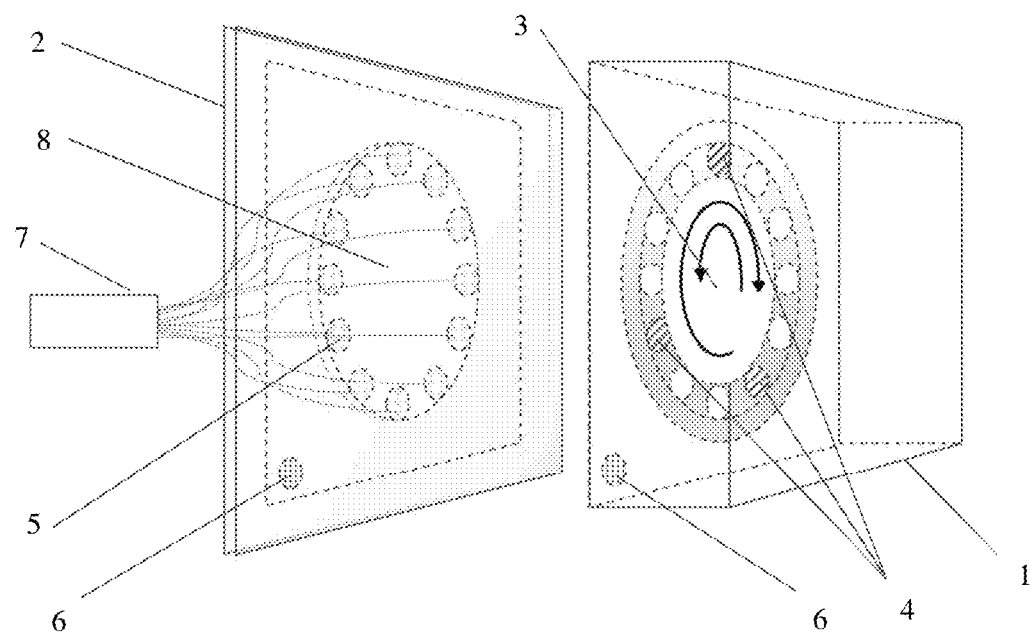
Figure 3:
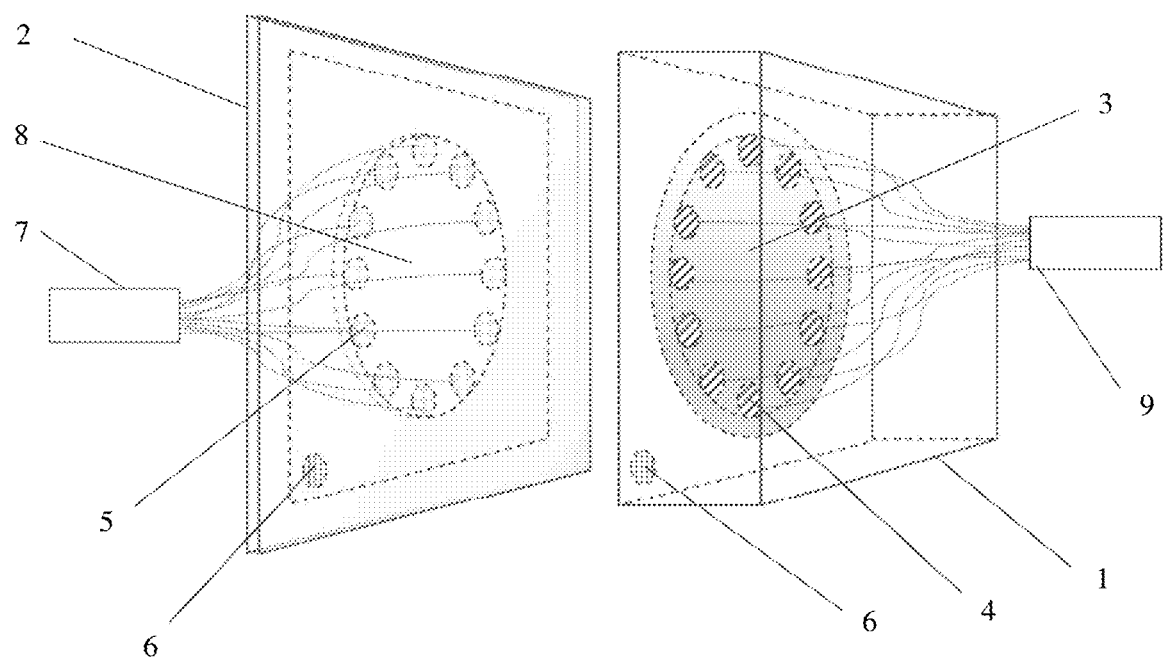

The invention is more thoroughly explained in the example embodiments, which do not limit its scope, and in the illustration where FIG. 1 shows schematically a device fitted with a magnetic system with permanent magnets in axonometric view, FIG. 2 shows schematically, in axonometric view, a device with a magnetic system astatically embedded in the transmitter, and FIG. 3 shows schematically, in axonometric view, a device with time varying magnetic field generators.

EXAMPLE I

Receiver 2 has a matrix 8 made in the form of a dial, where in the place of each hour a magnetic field sensor 5 which senses magnetic field is fitted. Matrix 8 of magnetic sensors 5 is coupled to the first microprocessor controller 7. The transmitter 1 has a magnetic system 3 also shaped in accordance with the configuration of the magnetic sensors 5 on the matrix 8. In places corresponding to twelve, five and eight o'clock there have been fitted permanent magnets 4. Once placing the transmitter 1 against the receiver 2, the magnetic field sensors 5 sense the magnetic field generated by the magmatic elements 4 of the transmitter 1 and send this information to the first microprocessor controller 7. For the purpose of appropriate matching, the transmitter 1 and the receiver 2 are equipped with location markers 6. In the first microprocessor controller 7 a comparison is conducted between the configuration of the magnetic field generated by the magnetic elements 4 and the pattern, and then the dedicated software launches an action ascribed to a particular configuration, e.g. "switch the device to a different mode". A failure to identify the configuration does not result in starting an action, or, alternatively, identification of a configuration which is incompliant with the configuration patterns may result in starting a special action, pertaining to the detected unauthorized communication attempt.

EXAMPLE II

The device is built as in example I, whereas the magnetic system 3 is mounted rotatably against the surface of the permanent element of the transmitter 1. During the rotation of the magnetic system 3 for a given time at a given angular velocity or a sequence of such rotations with various rotation times and velocities, a time varying magnetic field is generated, which enables the transmission of more complicated massages to the receiver 2.

EXAMPLE III

The device is built as in example I, whereas the magnetic system 3 is equipped with elements generating time varying magnetic fields 4 controlled using the second controller 9 fitted in the transmitter 1, which enables transmission of more complicated massages addressed to the receiver 2.

The invention claimed is:

1. A method for wireless magnetic communication comprising processing of information encrypted by a transmitter using a magnetic field and decrypted by a receiver comprising proximity magnetic sensors, the method comprising:
   providing a transmitter including a planarly-shaped magnetic system having magnetic elements;
   disposing the transmitter adjacent a receiver having proximity magnetic sensors geometrically corresponding to the magnetic system and coupled to a first microprocessor controller;
   generating a magnetic field configuration by the transmitter magnetic elements;
   comparing the generated magnetic field configuration with a pre-determined pattern using the first microprocessor controller; and
   launching additional steps in accordance with the software embedded in the first microprocessor controller when the generated magnetic field matches the pre-determined pattern.

2. The method of claim 1, wherein the magnetic elements are permanent magnets.

3. The method of claim 2, wherein the magnetic system is embedded movably in a fixed element of the transmitter.

4. The method of claim 1, wherein the magnetic elements are time varying magnetic field generators.

5. The method of claim 4, wherein the transmitter includes a second microprocessor controller.

6. A device for wireless magnetic communication of encrypted information, comprising:
   a transmitter including a planarly-shaped magnetic system having embedded magnetic elements for generating a magnetic field configuration; and
   a receiver disposable adjacent the transmitter and including proximity magnetic sensors configured to geometrically correspond to the magnetic system, which sensors are coupled to a first microprocessor controller configured for comparing a transmitter-generated magnetic field with a pre-determined pattern to implement advancement to a next operational step when the generated magnetic field matches the pre-determined pattern.

7. The device of claim 6, wherein the magnetic elements are permanent magnets.

8. The device of claim 7, wherein the magnetic system is embedded movably in a fixed element of the transmitter.

9. The device of claim 6, wherein the magnetic elements are time varying magnetic field generators.

10. The device of claim 9, wherein the transmitter includes a second microprocessor controller.

11. The device of claim 6 wherein the transmitter and the receiver have location markers.

12. The device of claim 7, wherein the transmitter and the receiver have location markers.

13. The device of claim 8, wherein the transmitter and the receiver have location markers.

14. The device of claim 9, wherein the transmitter and the receiver have location markers.

15. The device of claim 10, wherein the transmitter and the receiver have location markers.

16. The method of claim 1, wherein the receiver is disposed on the transmitter.

17. The method of claim 6, wherein the receiver is disposed on the transmitter.

18. A device for wireless magnetic communication of encrypted information, comprising:
   a transmitter including a planarly-shaped magnetic system having embedded permanent magnetic elements for generating a magnetic field configuration; and
   a receiver disposed on the transmitter and including proximity magnetic sensors configured to geometrically correspond to the magnetic system, which sensors are coupled to a first microprocessor controller configured for comparing a transmitter-generated magnetic field with a pre-determined pattern to implement advancement to a next operational step when the generated magnetic field matches the pre-determined pattern.

* * * * *